US012752178B1

(12) United States Patent
Chung

(10) Patent No.: US 12,752,178 B1
(45) Date of Patent: Oct. 6, 2026

(54) LEAN STEERING SPATIAL MECHANISM FOR A RIDING DEVICE

(71) Applicant: RC INNOVATION, LLC, Berkeley, CA (US)

(72) Inventor: Rasyad Chung, Berkeley, CA (US)

(73) Assignee: RC INNOVATION, LLC, Berkeley, CA (US)

( * ) Notice: Subject to any disclaimer, the term of this patent is extended or adjusted under 35 U.S.C. 154(b) by 684 days.

(21) Appl. No.: 17/950,636

(22) Filed: Sep. 22, 2022

(51) Int. Cl.
*A63C 17/01* (2006.01)
*B62K 5/08* (2006.01)
*B62K 5/10* (2013.01)
*B62K 3/00* (2006.01)

(52) U.S. Cl.
CPC .............. *A63C 17/012* (2013.01); *B62K 5/08* (2013.01); *B62K 5/10* (2013.01); *B62K 3/002* (2013.01)

(58) Field of Classification Search
CPC ..... A63C 17/012; A63C 17/011; A63C 17/01; A63C 17/00; A63C 17/0093; B62K 3/002; B62K 5/08; B62K 5/10
See application file for complete search history.

(56) References Cited

U.S. PATENT DOCUMENTS 4,159,830 A * 7/1979 Solimine ................ A63C 17/01 280/11.28
5,263,725 A * 11/1993 Gesmer ................ A63C 17/015 280/11.28
5,868,408 A * 2/1999 Miller ................ A63C 17/0046 280/842
6,224,076 B1 * 5/2001 Kent .................... A63C 17/012 280/11.28
6,398,238 B1 * 6/2002 Shaw ..................... B62K 3/002 280/87.041
6,547,262 B1 * 4/2003 Yamada ................. A63C 17/01 280/11.28
6,557,873 B2 * 5/2003 Nardone ................ B62K 3/002 280/124.113
6,739,603 B1 * 5/2004 Powell ................... A63C 17/01 280/11.27
6,793,224 B2 * 9/2004 Stratton ............... A63C 17/012 280/87.041
7,044,485 B2 * 5/2006 Kent .................... A63C 17/012 280/87.041
7,159,879 B2 * 1/2007 Cole ...................... A63C 17/01 280/11.28
8,210,549 B1 * 7/2012 Swenson .............. A63C 17/015 280/11.28
8,246,058 B2 * 8/2012 Wang ................... A63C 17/012 280/11.28
(Continued)

*Primary Examiner* — James M Dolak
(74) *Attorney, Agent, or Firm* — Fox Rothschild LLP

(57) ABSTRACT

The invention comprises a truck and riding devices with a lean steering spatial mechanism comprised of rigid bodies and a single compliant body connected by joints forming a closed kinematic chain wherein the compliant body provides compression, tension, and torsional return spring forces for multi-axial functionality within the constraints of the lean steering spatial mechanism, allowing for the combined functionality of deep deck lean, improved lean steering control over a wider range of speed, improved speed stability, and full load bearing suspension. The invention has additional degrees of freedom and additional primary motions of floating and suspension.

9 Claims, 13 Drawing Sheets

(56) References Cited

U.S. PATENT DOCUMENTS

| | | | | |
|---|---|---|---|---|
| 8,579,300 | B2 * | 11/2013 | Fraley | A63C 17/012<br>280/11.28 |
| 8,602,422 | B2 * | 12/2013 | Wilson | A63C 17/006<br>280/11.27 |
| 8,752,849 | B1 * | 6/2014 | Fox | A63C 17/0093<br>280/87.042 |
| 9,908,032 | B2 * | 3/2018 | Garcia Elena | A63C 17/015 |
| 10,376,773 | B2 * | 8/2019 | Chung | A63C 17/012 |
| 10,967,244 | B2 * | 4/2021 | Lininger, Jr. | A63C 17/0046 |
| 11,383,150 | B1 * | 7/2022 | Chung | A63C 17/0093 |
| 11,590,408 | B2 * | 2/2023 | Chung | B62K 25/04 |
| 12,053,689 | B1 * | 8/2024 | Oliphant | A63C 17/015 |
| 2004/0100053 | A1 * | 5/2004 | Chen | B62K 3/002<br>280/87.041 |
| 2006/0006622 | A1 * | 1/2006 | Gesmer | A63C 17/01<br>280/87.042 |

* cited by examiner

LEAN STEERING SPATIAL MECHANISM FOR A RIDING DEVICE

CROSS-REFERENCE TO RELATED APPLICATION

Not applicable.

STATEMENT REGARDING PRIOR DISCLOSURES BY THE INVENTOR OR A JOINT INVENTOR

The following disclosure is submitted: U.S. patent Ser. No. 11/383,150 issued on Jul. 12, 2022.

BACKGROUND OF THE INVENTION

Since the early 1960s there has been a strong connection between surfing and skateboarding that has influenced the history of skateboard design as well as the larger culture of board sports. Terms like "sidewalk surfing" and "surfing-like ride and feel" speak to this connection and have been used to describe ways skateboards attempt to mimic the sensations and ride dynamics of surfing.

Surfing, and other board sports share common ride dynamics of deep deck lean, stability at speed and the ability to "carve" turns.

"Carving" is the ability to make turns and control speed and is associated with deep deck lean and a feeling of "sinking into" the turn such that the deeper the deck or board is leaned the stronger the carving sensations. Carving turns typically involves higher speed and higher turn forces that must be matched by rider input, commitment, and advanced skill. With carving there is also a weightless, floating sensation experienced in the transition between linked turns.

Existing lean-steering spatial mechanisms of skateboards, skates and the like are commonly referred to as a "truck-assembly", or simply a "truck". A skateboard truck typically comprises two rigid bodies generally referred to as a baseplate and a hanger where the baseplate is mounted to a deck and the hanger supports two laterally spaced wheels that roll on the ground. The rigid bodies of baseplate and hanger are kinematically linked so as to allow rotation relative to each other about a common axis defined by the geometry of the baseplate called here the "hanger pivot axis". The compliant bodies of existing trucks are compression springs or elastomeric bushings that are sandwiched between and held in place by the rigid bodies of the assembly.

A skateboard typically comprises a deck upon which the rider stands and a pair of trucks symmetrically mounted to each end of the deck. With wheels constrained by the plane of the ground, leaning input results in steering output such that a rider standing on the deck leans the deck right to steer right and left to steer left.

Spatial Mechanism Definitions Order of Discussion and Dependency

The truck of prior art and the present invention are both understood to be lean steering spatial mechanisms that follow the logic that unique kinematic designs produce unique kinetics which in turn, produce unique ride dynamics.

Kinematics.

As described and defined herein the present invention is a lean steering spatial mechanism comprised of both rigid and compliant bodies connected by kinematic joints and constrained by wheels on the plane of the ground, wherein:

Rigid bodies are herein defined as not to deform under the action of applied forces.

Compliant bodies are herein defined to be flexible bodies that couple and constrain the motion of the rigid bodies and so transfer input forces and displacements to an output force and displacement at another location through elastic body deformation.

Specific joints will be described that define kinematic pairs of rigid bodies and the resultant degrees of freedom of the kinematic chain of rigid bodies of the present invention.

Specific geometry of the rigid and compliant bodies and the orientation and relationship of the kinematic joints required to create the motions of the present invention will be described.

Given that laterally-spaced wheels in contact with and designed to roll on the surface of the ground are in common use, the kinematic joints that connect the wheels and wheel bearings to the hanger axles will not be counted in the total of degrees of freedom discussed with regard to prior art or the present invention.

The plane of the ground is defined as the fixed frame of the spatial mechanism of prior art and the present invention. With prior art and the present invention, wheels are connected to the ground by means of gravity.

Kinetics.

Lean steering spatial mechanisms are herein defined as spatial mechanisms where rider input leaning a deck or frame produces a steering response of the wheels on the ground. Further discussion will consider the action of input, output and vector control of forces of the spatial mechanism of the present invention. A dynamic relationship exists between the rigid and compliant bodies and the specific geometry and kinematic design of the present invention that results in motions described herein as leaning, steering, floating, and suspension.

Ride Dynamics.

This section will describe the general utility, performance, and advantages derived therefrom the combination of kinematics and kinetics of the present invention.

The present invention introduces a new class of skateboard truck with a unique kinematic design and kinematics that produce ride dynamics with improved deep deck lean, improved steering control, improved stability at speed, and improved suspension. By delivering this combination of functional attributes the present invention is thus of great use to riders in search of a more powerful surfing-like ride feel.

PRIOR ART

Double Spring Trucks—Kinematic Description.

As shown in FIGS. 3-5 double spring trucks of prior art are a class of trucks that utilize two rigid bodies: (1) a baseplate 900 and (2) a hanger 910; a pair of compliant bodies in the form of compression coil springs 902; and a pair of laterally spaced wheels that roll on the ground.

Kinematic diagram FIG. 5 shows the two rigid bodies, baseplate 900 and hanger 910, connected by revolute joint 90 and secured by a pivot bolt 97 and nut 98 as shown.

Hanger pivot axis 91 is defined by the central axis of revolute joint 90.

A "hanger pivot plane" 92 is the central longitudinal plane of baseplate 900 perpendicular to top mounting surface 901 and coincident with hanger pivot axis 91.

Hanger pivot axis 91 and hanger pivot plane 92 are fixed elements of the geometry of baseplate 900 such that leaning of baseplate 900 also leans hanger pivot plane 92 and hanger pivot axis 91. With double spring trucks hanger pivot axis 91 provides a single degree of freedom about which the pair of rigid bodies, baseplate 900 and hanger 910, rotate relative to each other.

A "hanger pivot axis angle" 93 is typically defined by the inclined angle of the end of the skateboard deck or the frame of the riding device to which the baseplate is mounted, typically in the range of 30 to 45 degrees relative to the plane of the ground.

A "virtual pivot point" 94 is located at the intersection the hanger pivot axis 91 and a line projected vertically from the center of hanger axle axis 95. The assembly of a skateboard with a deck connected with a front and rear double spring truck creates a single deck roll axis called here the "virtual pivot point roll axis" 96 that is defined by the virtual pivot points 94 of the front and rear trucks.

As will be discussed, with prior art, the compliant bodies, compression springs 902, are independent of the geometry and kinematic relationship between the rigid bodies of baseplate 900 and hanger 910.

Double Spring Trucks-Kinetic Description.

In use a rider stands on the deck of an assembled skateboard with the wheels constrained by the plane of the ground. On a skateboard with double spring trucks of the prior art, rider input to lean the deck directly causes the rotation of the deck and baseplates along with the hanger pivot axes 91 and now coplanar hanger pivot planes 92 of the front and rear trucks to rotate about the virtual pivot point roll axis 96. Constrained by the plane of the ground, the leaning input of the deck and baseplates 900 directly causes the hangers 910 to rotate about the hanger pivot axis 91 of each truck resulting in a lean-steering response.

With the seesaw motion of the hanger of double spring trucks of prior art, the pair of compression coil springs 902 are positioned in opposition to each other such that compression of one spring allows extension of the other. Consequently, when the springs are preloaded further compression of one spring during leaning is assisted by extension of the other spring thus creating a "dead band" that does not provide a return to center spring force. Leaning beyond the dead band allows the opposing spring to fully extend which allows the expected return to center spring force generated by the compressed spring to bias the truck toward a central and neutral position.

Compression springs 902 only provide return to center and do not factor into the steering ratio of leaning input to steering output.

Compression springs 902 do not provide load bearing suspension when both wheels are in contact with the ground.

Compression springs 902 are sandwiched between baseplate 900 and hanger 910 and are held in place by recesses in baseplate 900 and hanger 910 such that they only function in compression and not in tension.

Double Spring Trucks-Ride Dynamics.

While the pair of compression springs in a double spring truck provides a measure of return to center spring force when leaning past the dead band, the springs do not add suspension because revolute joint 90 is a rigid load path and so lacks the range of motion between the rigid bodies of baseplate 900 and hanger 910 necessary for suspension. Therefore, vibrations and impacts from the interaction of the wheels rolling on the ground transfer to hanger 910 through revolute joint 90 directly to baseplate 900 and to the deck and feet of the rider.

The lack of suspension also results in reduced wheel traction on the ground as the wheels bounce over the surface. As roads become rougher, and speed increases the high steering sensitivity and harshness of double spring trucks becomes more noticeable, adversely effecting both rider comfort and control.

Double spring trucks typically have very sensitive steering such that small and large leaning motion of the deck and baseplates causes immediate steering response of the hangers and wheels on the ground. High steering sensitivity is beneficial for tight turns at slower speeds but less suitable for higher speed, especially at the limits of traction when turning.

Another consequence of the high steering sensitivity of double spring trucks is that asymmetrical contact between the wheels rolling on the ground and surface irregularities, called here "bump steer", transfers directly through revolute joint 90 to the baseplate, deck and to the rider.

BRIEF SUMMARY OF THE INVENTION

The present invention comprises a truck and further comprises riding devices comprised of a front truck, a rear truck, and a deck, or riding devices comprised of a single truck, a wheel, and a deck. The truck may be used with a skateboard, or with any riding device with a deck, as non-limiting examples: scooters, roller skates (where the sole of the skate is equivalent to a deck), and for motor vehicles (where the chassis or frame is equivalent to a deck). As used herein, "skateboard" shall include all riding devices. The truck of the present invention provides the combined functionality of deep deck lean, improved lean steering control over a wider range of speed, improved speed stability, and full load bearing suspension compared to existing trucks.

The present invention has additional rigid bodies, additional degrees of freedom, and additional primary motions when compared to the trucks of prior art.

The compliant body of the present invention may be a coil spring or an elastomeric component connected to the rigid bodies forming a closed kinematic chain in such a way that the single compliant body provides compression, tension, and torsional return spring forces for multi-axial functionality within the constraints of the lean steering spatial mechanism as a whole.

Prior art comprises two rigid bodies with one degree of freedom: rotation about a hanger pivot axis. The present invention has more than one degree of freedom. The first embodiment has three degrees of rotational freedom: rotation about hanger pivot axis 22; rotation about longitudinal roll axis 20; and rotation about transverse axis 21. In the second embodiment has four degrees of rotation freedom, rotation about spherical joint 31 that provides three degrees of freedom, and an additional rotational degree of freedom about transverse axis 46 of revolute joint 30 that provides additional degree of rotational freedom.

Prior art comprises two primary motions: leaning, and steering. The present invention comprises four primary motions: leaning, steering, floating, and suspension.

The motion of floating of the present invention is an adjustable range of independence between the motions of leaning and steering, so that there can be leaning without steering and steering without leaning.

The motion of suspension of the present invention is a function of the kinematic design that connects the rigid bodies with a compliant body to provide multi-axial functionality.

The present invention uses a single compliant body in each truck, either a single spring or an elastomeric component that couples and constrains the rigid bodies to provide return to center and full load-bearing suspension. In addition, the single compliant body of the present invention couples the motions of leaning and steering that would be otherwise kinematically independent. In use a rider producing leaning input to the deck of an assembled skateboard of the present invention, with the wheels constrained by contact with a riding surface such as the plane of the ground, compresses the compliant body of the truck that then transfers torque between the rigid bodies that in turn produces steering output to the hanger and wheels.

BRIEF DESCRIPTION OF THE DRAWINGS OF THE PRESENT INVENTION

DETAILED DESCRIPTION OF THE INVENTION

Kinematic Description of Present Invention.

As used herein, a revolute joint connects two rigid bodies to allow a single degree of rotational freedom about a common central axis. A spherical joint connects two rigid bodies to allow three degrees of rotational freedom which are sometimes referred to as pitch, roll, and yaw.

Certain combinations of kinematic joints can have identical degrees of freedom. For example, the three revolute joints 10, 11, and 12 of the first embodiment have the same degrees of freedom as spherical joint 31 of the second embodiment.

The present invention is a closed kinematic chain comprised of rigid bodies and a compliant body connected by kinematic joints as shown or by other kinematic joints as known in the art that would allow the same degrees of freedom, functional geometry, and primary motions.

Constrained by wheels rolling on the plane of a riding surface the truck of the present invention becomes a lean-steering spatial mechanism.

A spatial mechanism will allow different motions depending on the specific kinematic design, input force to the mechanism, and on how the mechanism is constrained. As used here, skateboards, scooters, roller skates, and wheeled vehicles in general utilize wheels connected to the plane of the ground by the force of gravity. As used herein, “ground” may mean any riding surface.

The present invention has a kinematic design such that the load path of input and output forces are shared by the rigid bodies and by the compliant body in all conditions of use.

The single compliant body of the present invention has multiple simultaneous functions, comprising: to provide return to center spring force to return the kinematic chain to a central and neutral position; to provide spring force for full load bearing suspension; and to provide torque transfer wherein the leaning input is transferred to steering output.

Within the kinematic design of the present invention specific geometry may be adjusted to accommodate various steering response and performance requirements for a multiplicity of lean steering vehicles such as skateboards, scooters, personal mobility devices and the like.

FIRST EMBODIMENT

Figure 6:
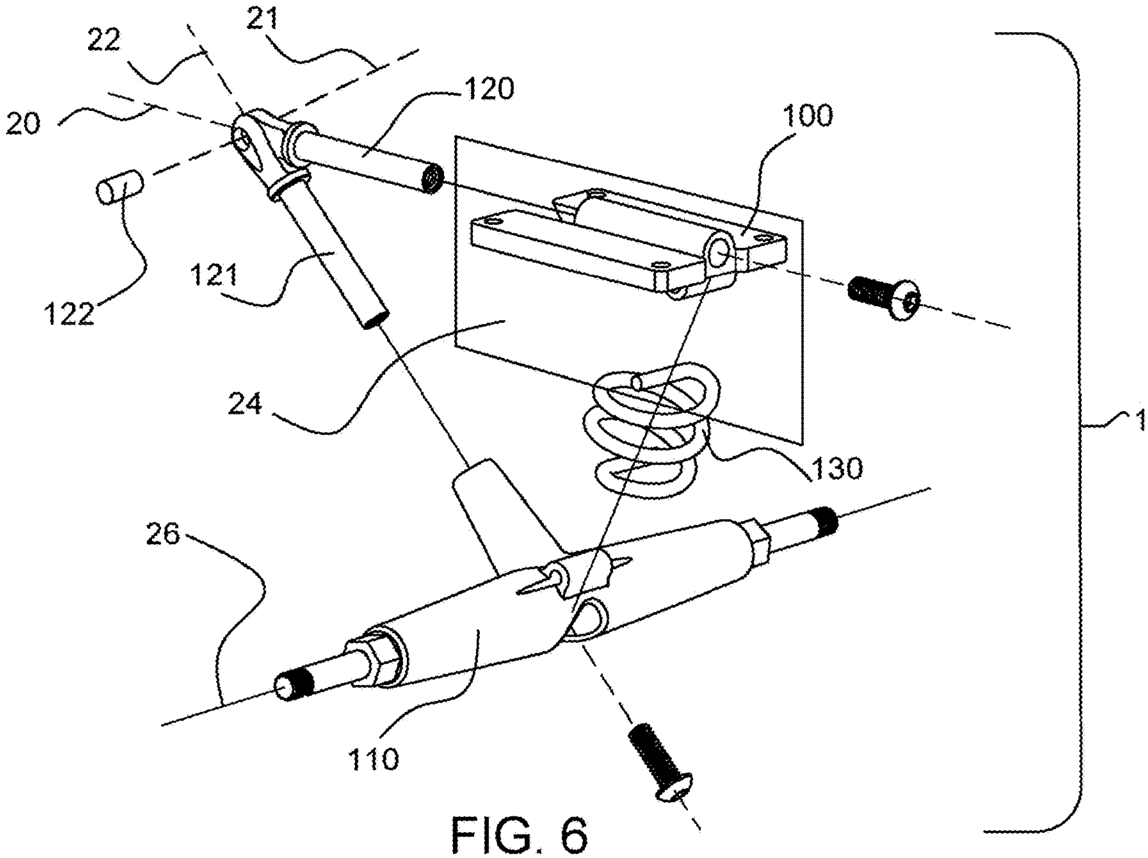
FIG. 6 shows an exploded perspective view of the four rigid bodies and single compliant body in an embodiment of the first embodiment of the present invention.
Figure 7:
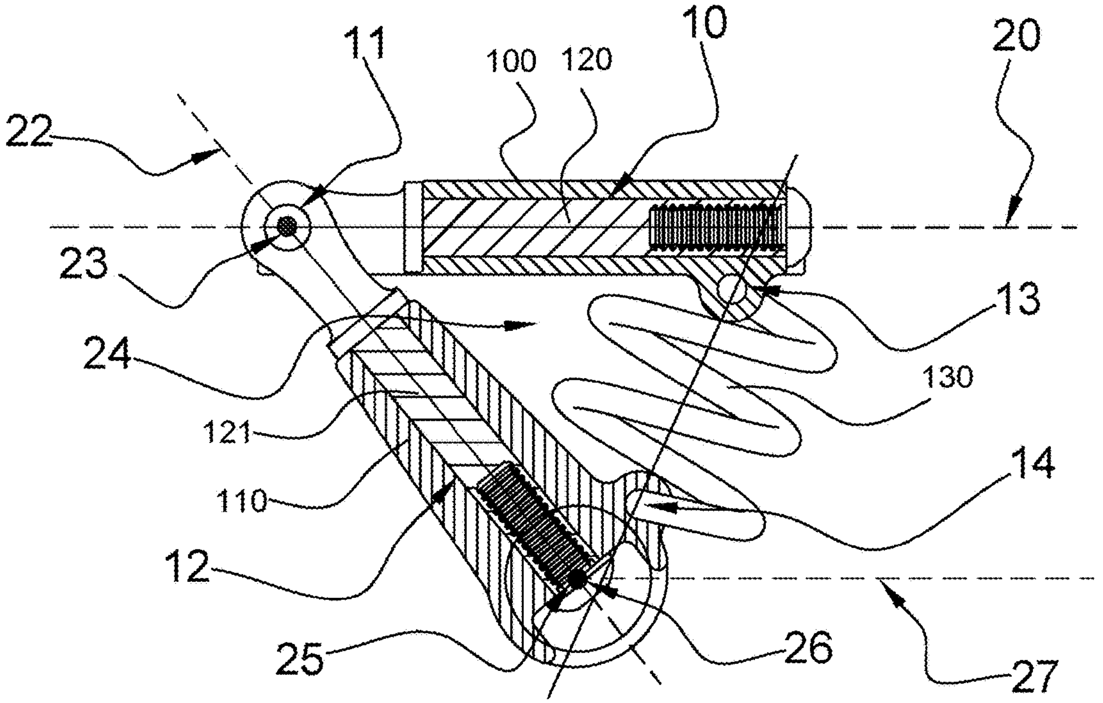
FIG. 7 shows the kinematic diagram of the first embodiment of the present invention.

FIGS. 6 and 7 show one embodiment of the present invention. In this embodiment, a truck 1 may be either a front truck or a rear truck, and may be on any riding vehicle, including but not limited to skateboards, roller skates, or scooters.

Figure 22:
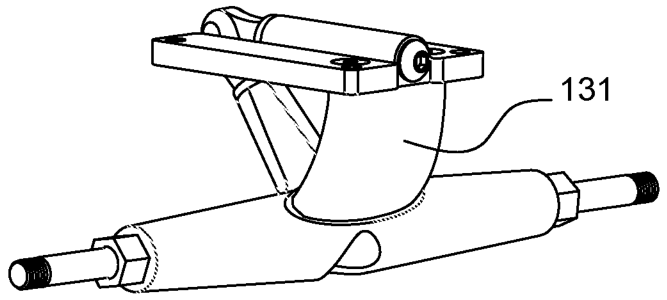
FIG. 22 shows a rear perspective view of an embodiment of the first embodiment with an elastomeric compliant body.

This embodiment is comprised of four rigid bodies: baseplate 100, upper pivot arm 120, lower pivot arm 121, hanger 110; and a single compliant body with an upper end of the compliant body connected with the baseplate and a lower end of the compliant body connected with the hanger. In some embodiments, the compliant body may be spring 130. In other embodiments the compliant body may be an elastomeric component 131, as shown in FIG. 22.

When baseplate 100 is rigidly connected with a deck, baseplate 100 and the deck form a single rigid body Baseplate 100 has a body with a top surface, a bottom surface, a longitudinal bore, and a transverse bore connected with the bottom surface for receiving a spring arm. Baseplate 100 is connected to upper pivot arm 120 by means of first revolute joint 10 wherein the longitudinal cylindrical bore of baseplate 100 receives a bearing shaft end of upper pivot arm 120 and is secured by a bolt as shown or other means known in the art. A longitudinal roll axis 20 is defined by the centroid axis of revolute joint 10.

Upper pivot arm 120 is connected to lower pivot arm 121 by a second revolute joint 11 wherein an eyebolt end of upper pivot bolt 120 is disposed within and received by a yoke end of lower pivot arm 121 and secured by pin 122 as shown or by other means known in the art. A transverse axis 21 is defined by the centroid axis of revolute joint 11.

Hanger 110 is comprised of a hanger body with a cylindrical bore, and an axle connected with two laterally spaced wheels 2 along axle axis 26. Lower pivot arm 121 is connected to hanger 110 by means of a third revolute joint 12 wherein a bearing shaft end of lower pivot bolt 121 is disposed within and received by the cylindrical bore of hanger 110 and secured by a bolt as shown or by other means known in the art. A hanger pivot axis 22 is defined by the centroid axis of revolute joint 12.

In some embodiments the compliant body is a coil spring 130 with parallel sides, however, any spring shape could be used, as non-limiting examples barrel shaped springs, beehive springs, flat springs, machined springs or torsion bars.

In some embodiments with spring 130, the upper end may be an upper spring arm that is moveably connected with the transverse bore on the bottom surface of baseplate 100 forming revolute joint 13. And, the lower end of the compliant body may be a lower spring arm that is moveably connected with a transverse bore on hanger 110, forming a revolute joint 14.

The riding device of the present invention has a primary motion of suspension. Suspension comprises compression and extension of the compliant body along with rotation of the upper pivot arm and the lower pivot arm about the transverse axis, allowing baseplate 100 and hanger to move relative to each other.

In the present invention, connections between rigid bodies baseplate 100 and hanger 110 and the compliant body spring 130 are made by means of revolute joints 13 and 14 respectively. However, it is important to note that the motion and function of compliant body in all embodiments is largely independent of the method of connecting the compliant body to the rigid bodies. Therefore, with the present invention any means of connection between the rigid bodies and the compliant body known in the art could be used. As non-limiting examples a fixed and bolted connection on one or both ends of the compliant body may connect the compliant body with the rigid bodies, or a combination of bolted connection on one end and spherical connection on the other could be used as a matter of manufacturing or application specific preference.

Figure 23:
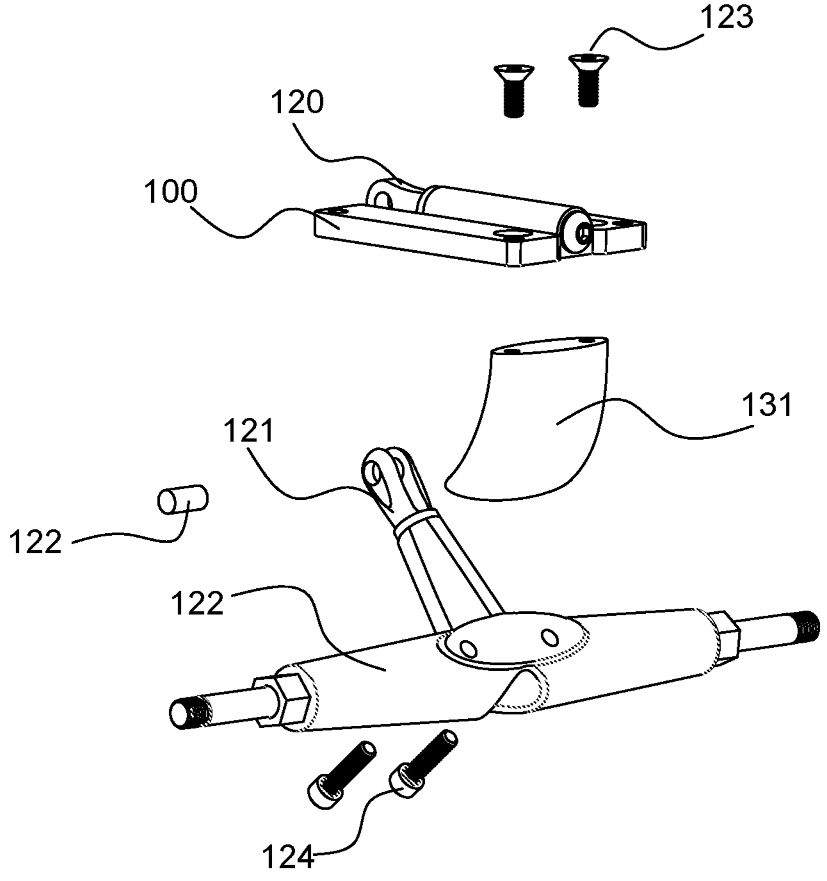
FIG. 23 shows an exploded view of an embodiment of the first embodiment with an elastomeric compliant body.

FIGS. 22 and 23 show the compliant body may also be an elastomeric component 131 with an upper end that may be fastened to baseplate 101 by means of screws 123, or by other means known in the art, and a lower end of elastomeric component 131 that may be fastened to hanger 111 by means of screws 124, or by other means known in the art.

With the present invention control of force vectors needed to produce the desired motions and ride dynamics is accomplished through the overall geometry, kinematic design and through the design of the compliant body itself.

A longitudinal roll axis 20 is defined by revolute joint 10 and provides a first degree of rotational freedom.

A transverse axis 21 is defined by revolute joint 11 and provides a second degree of rotational freedom.

A hanger pivot axis 22 is defined by the axis of revolute joint 12 and provides a third degree of rotational freedom.

A hanger pivot plane 24 is a virtual plane reciprocally defined by longitudinal roll axis 20 and any point along hanger pivot axis 22 as well as hanger pivot axis 22 and any point along longitudinal roll axis 20. Thus, hanger pivot axis 22 and longitudinal roll axis 20 and the hanger pivot plane 24 are all coplanar.

The hanger pivot plane 24 of the first embodiment of the present invention is a virtual plane that floats between baseplate 100 and hanger 110.

A transverse axis point 23, shown in FIG. 7, is defined by the intersection of transverse axis 21, longitudinal roll axis 20, and hanger pivot axis 22, and is coincident with hanger pivot plane 24.

A virtual pivot point 25 is the intersection of hanger pivot axis 22 and hanger axle axis 26, shown in FIG. 7.

With the assembly of a skateboard of the present invention (comprising a front truck, a rear truck, and a deck) a virtual pivot point roll axis 27 is defined by a virtual line running between the virtual pivot points 25 of the front and rear trucks.

The hanger pivot plane 24 is useful for understanding the motions and degrees of freedom in the present invention and for understanding the difference between the double spring trucks of prior art and the present invention.

With double spring trucks of prior art, hanger pivot plane 92 is the central longitudinal plane and a fixed part of the geometry of the rigid body comprised of a deck and mounted baseplate 900. As such, leaning of the deck and mounted baseplate 900 leans the hanger pivot plane 92 and hanger pivot axis 91 relative to hanger 910 and the ground.

In contrast the hanger pivot plane 24 of the first embodiment of the present invention is a virtual plane that floats between baseplate 100 and hanger 110 such that leaning baseplate 100 is independent of the orientation of hanger pivot plane 24 with the plane of the ground.

The truck of the present invention may be used on roller skates, or on the front or rear of scooters and kickboards, or other riding devices that require lean steering spatial mechanisms to function, when human and gravity powered or motorized.

SECOND EMBODIMENT

The first and second embodiments share equivalent kinematics, kinetics, and ride dynamics, although the two embodiments have differences in the number of rigid bodies, in the type and number of kinematic joints, in the design of the compliant body, and in the method of connecting the compliant body with the rigid bodies. One significant difference is an increased range of suspension in the second embodiment, allowed by the two transverse axes of the second embodiment.

The second embodiment comprises a truck 1 that may be a front truck or a rear truck and may be on any riding device, including but not limited to skateboards, roller skates, scooters, or other lean steering vehicles both human and gravity powered as well as motorized.

Figure 8:
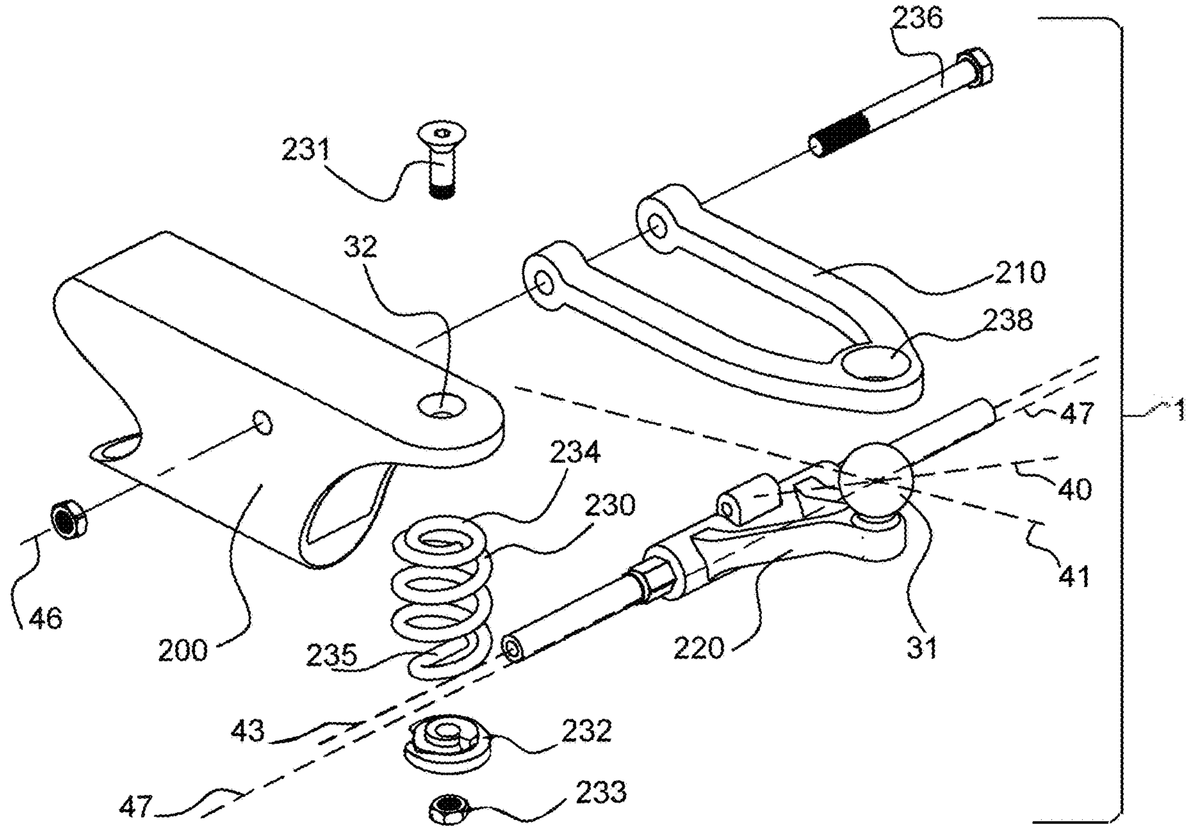
FIG. 8 shows an exploded perspective view of the three rigid bodies and single compliant body of an embodiment of the second embodiment of the present invention, with the closest swingarm not shown for clarity.
Figure 9:
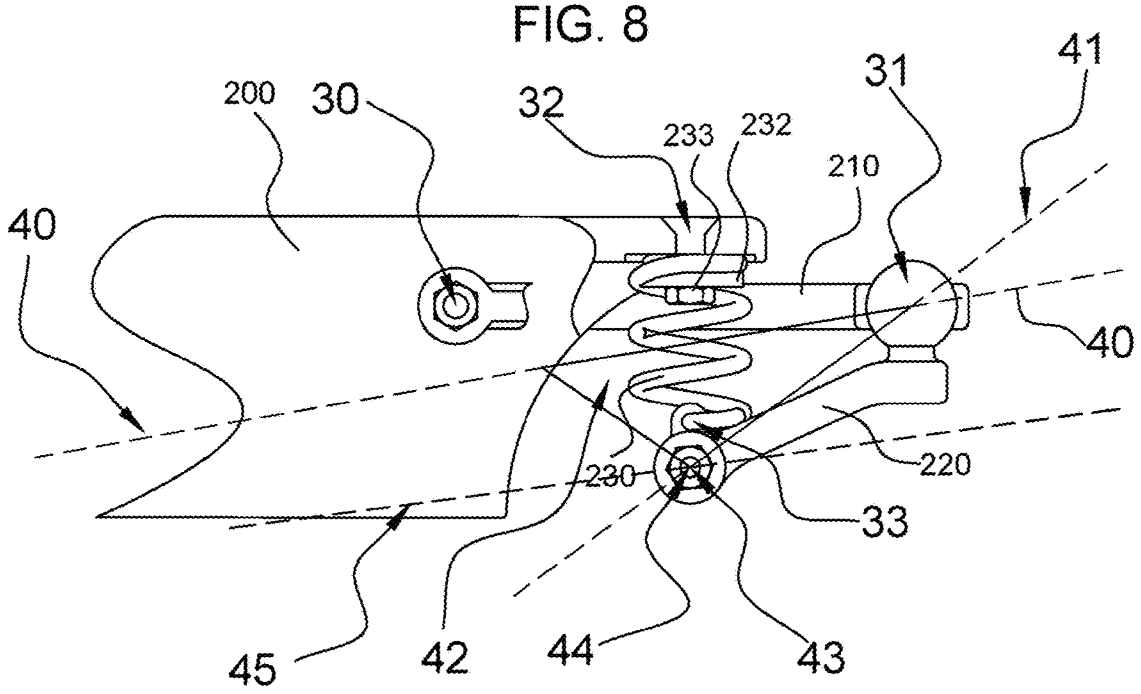
FIG. 9 shows the kinematic diagram of the second embodiment of the present invention.
Figure 24:
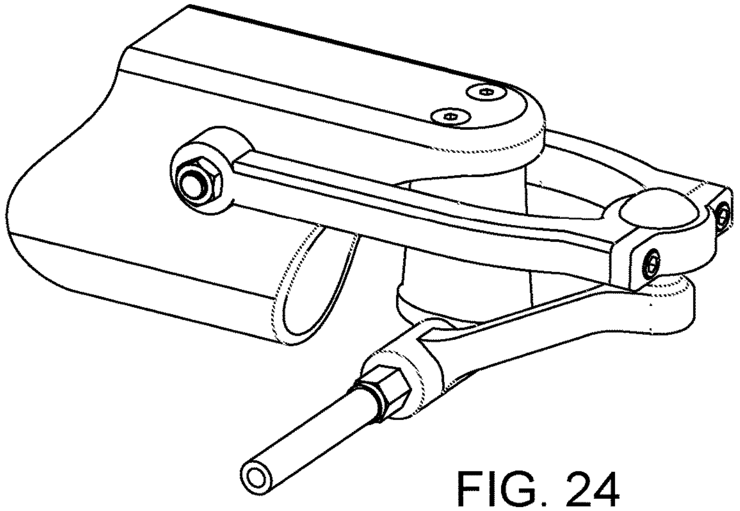
FIG. 24 shows a rear perspective view of an embodiment of the second embodiment with an elastomeric compliant body.
Figure 25:
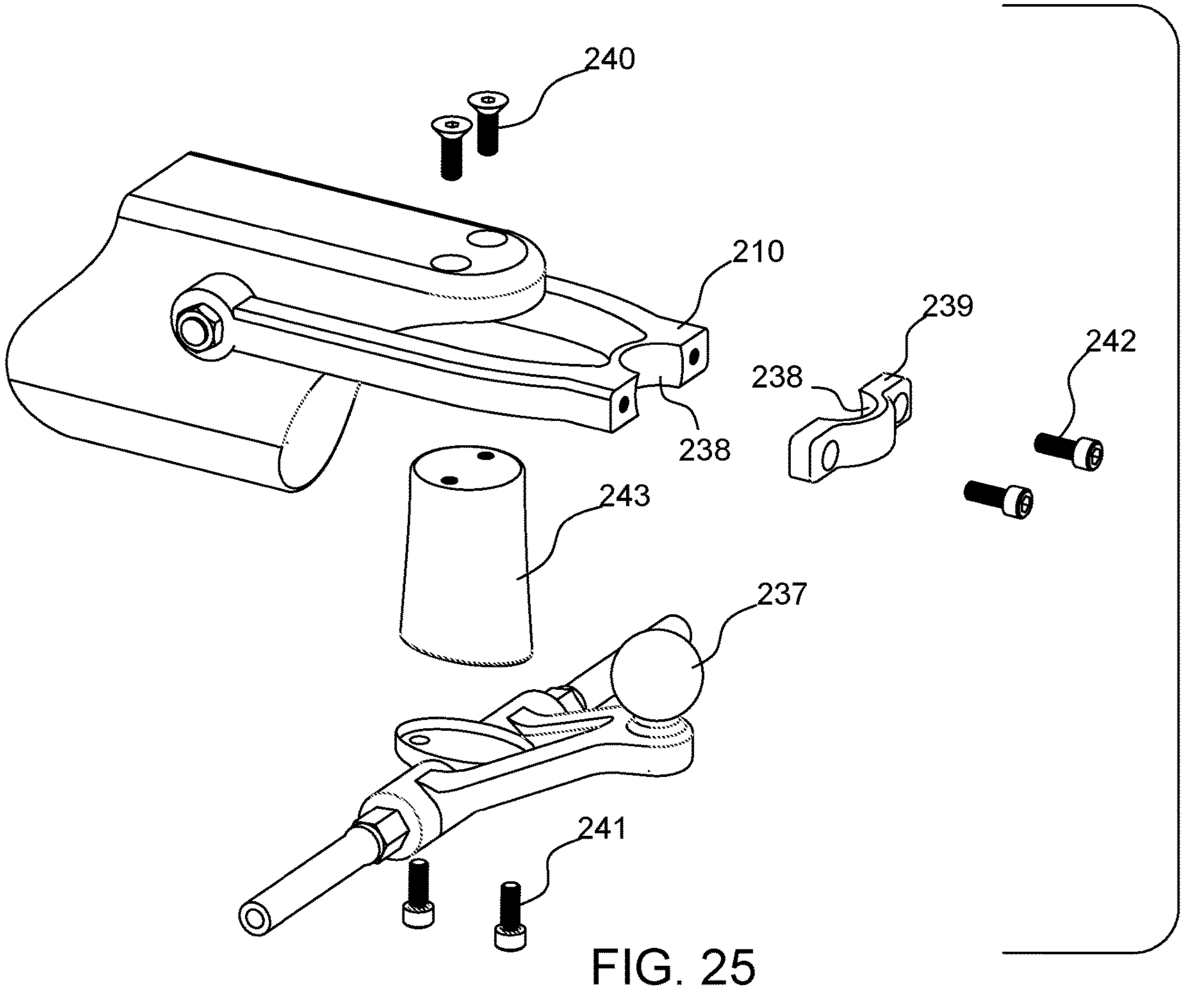
FIG. 25 shows an exploded view of an embodiment of the second embodiment with an elastomeric compliant body.

As shown in FIGS. 8-9, the truck of the second embodiment comprises three rigid bodies, frame 200, swingarm 210, hanger 220, and a compliant body. In some embodiments the compliant body is spring 230 with an upper arm and a lower arm. In other embodiments, the compliant body is an elastomeric component with an upper end and a lower end, as shown in FIGS. 24 and 25.

Figure 1:
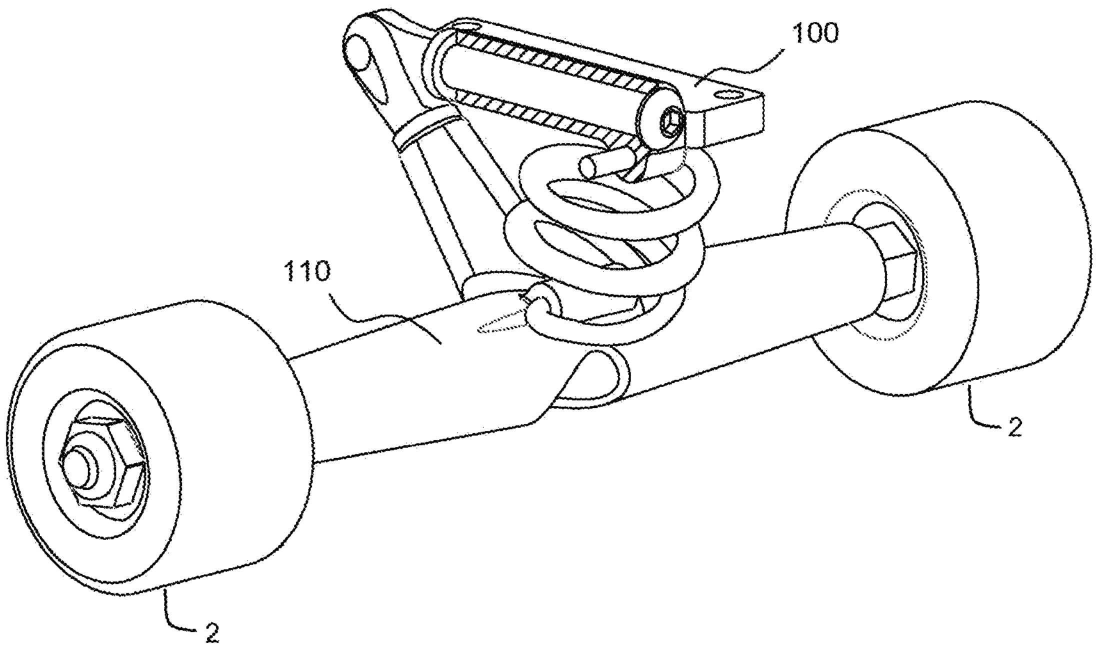
FIG. 1 shows partial cut away perspective view of the first embodiment of present invention.
Figure 2:
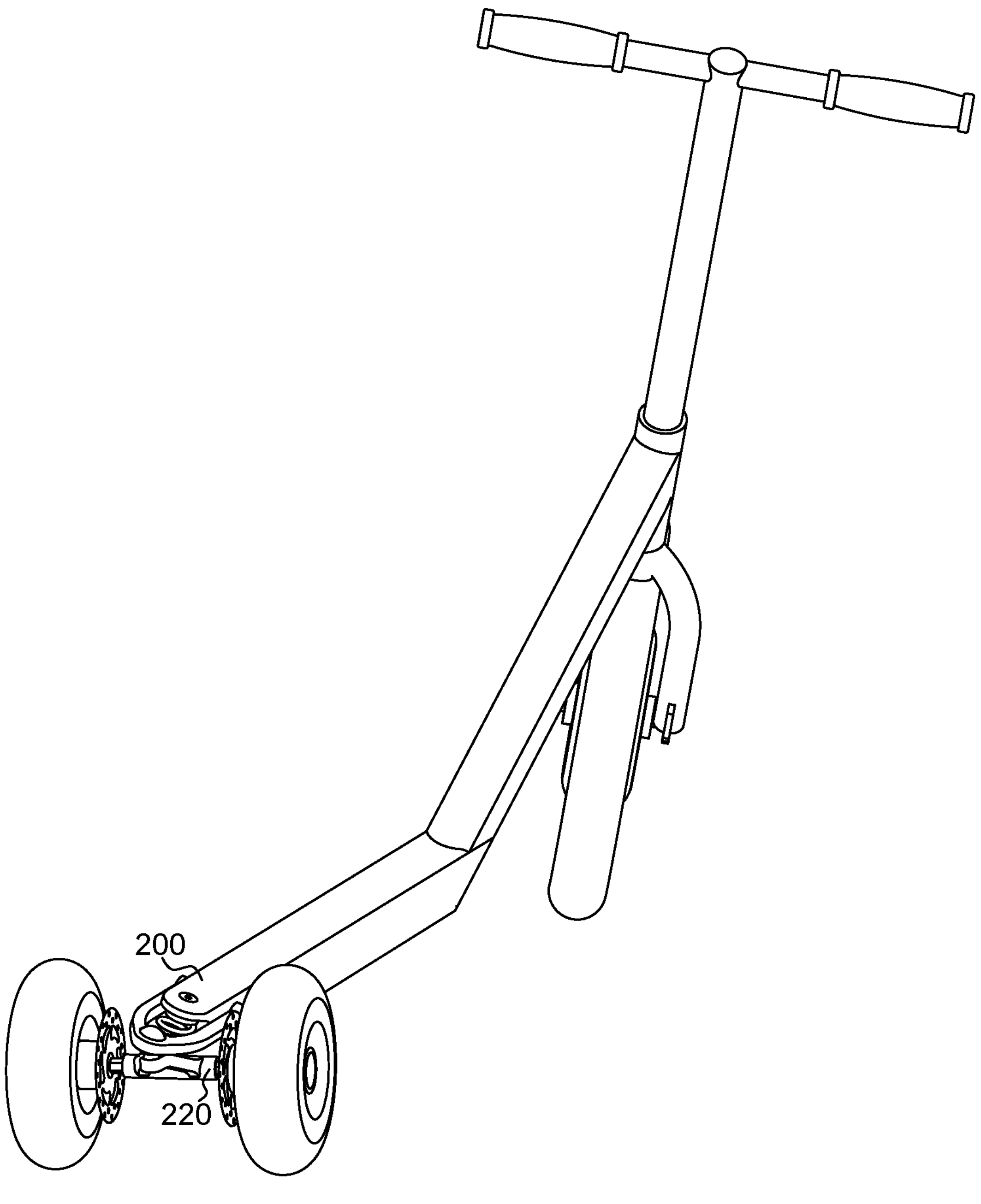
FIG. 2 shows a rear perspective view of the second embodiment of the present invention mounted to the rear of a scooter.
Figure 3:
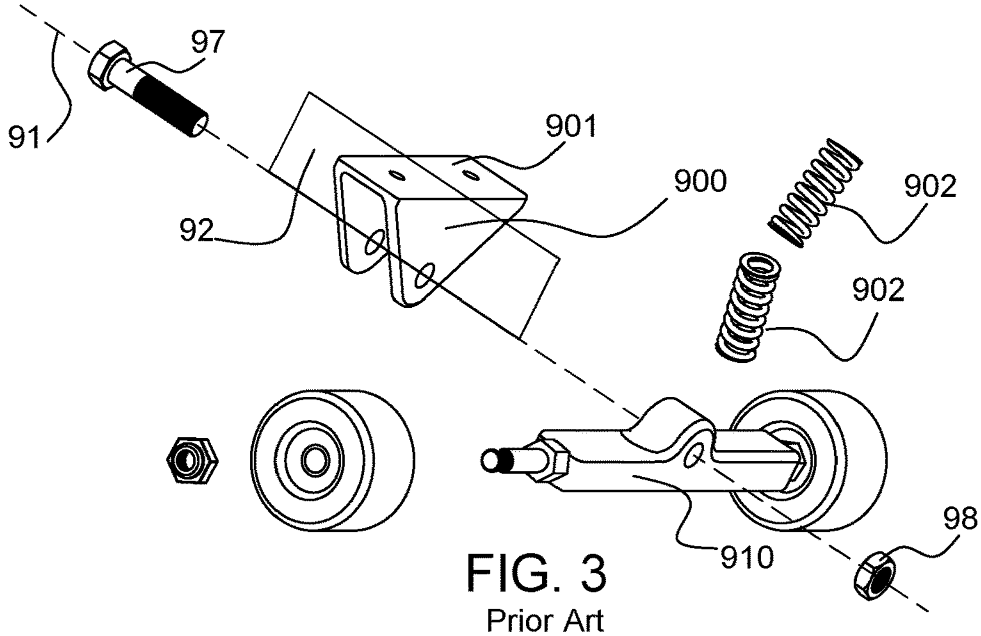
FIG. 3 Prior Art
FIG. 3 shows an exploded perspective view of the two rigid bodies of the double spring truck of prior art.
Figure 4:
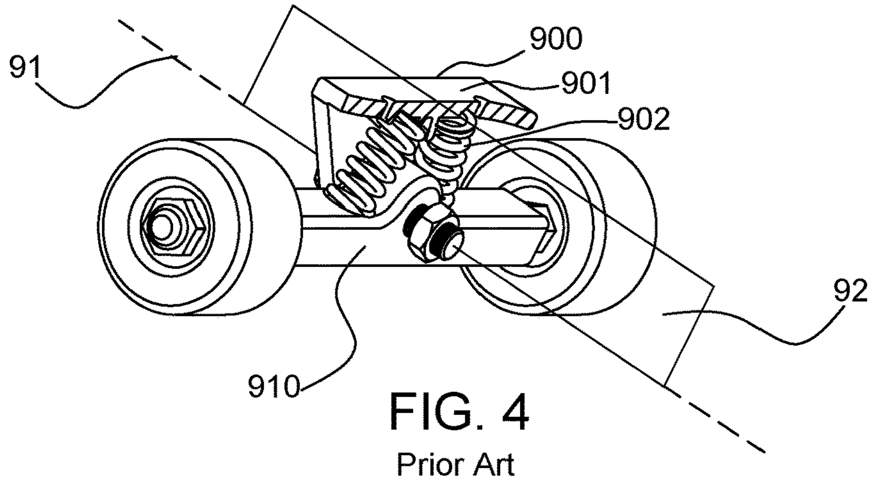
FIG. 4 Prior Art
FIG. 4 shows a perspective partial cut-away view of the double spring truck of prior art.
Figure 5:
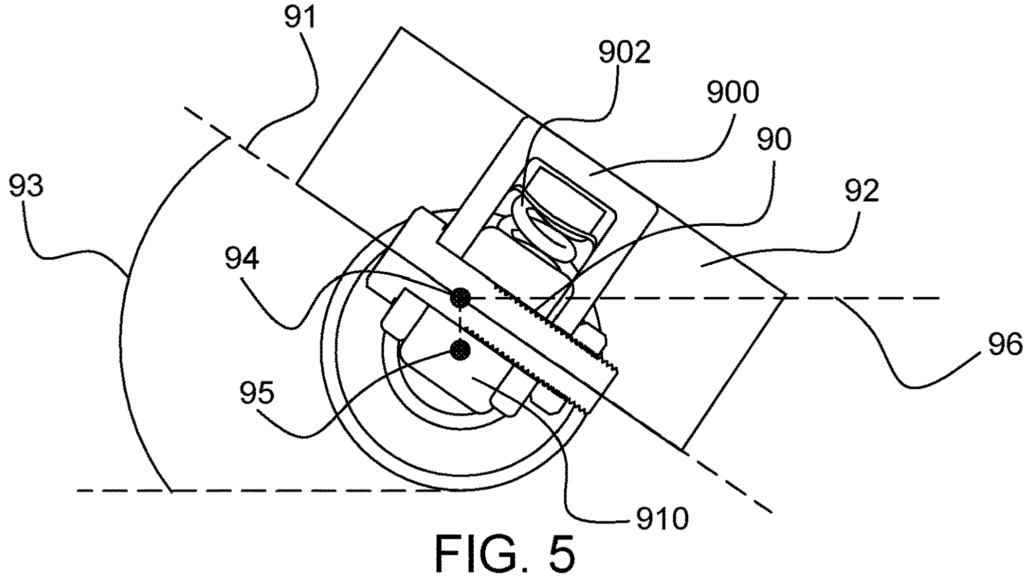
FIG. 5 Prior Art
FIG. 5 shows the kinematic diagram of the double spring truck of prior art.

In a preferred embodiment, frame 200 is comprised of a top surface to stand on or mount a deck on, a right side surface, a left side surface, and a bottom surface. A front portion of frame 200 supports a scooter steering column, forks, front wheel and handlebar as are in common use, a non-limiting example of which is shown in FIG. 2. The frame may be connected with a deck in which case the frame and deck comprise one rigid body. Or, or the top surface of the frame may serve as the deck. A rear portion of frame 200 has transverse, coincident, and concentric bores through the right side surface and left side surface that receive fastening bolt 236. Each concentric bore provides a cylindrical bearing surface for the shaft of fastening bolt 236. Common lubricous washers (not shown) may be used between the side surfaces of frame 200 and swingarm 210. A portion of frame 200 has a projection for mounting of the compliant body. In the scooter embodiment, the concentric bores and the frame projection are at the rear of the frame and scooter.

Swingarm 210 is comprised of a left arm and a right arm, with the left and right arm each having a first end and a second end. Swingarm 210 has a width dimension between the left and right arms that is sized to receive and moveably mate to the outside left and right side surfaces of frame 200 as shown. The first end of the left arm has a bore, and the first end of the right arm has a bore. The left arm and right arm converge at the second end, and female spherical bearing surface 238 is disposed within the second end of the swingarm 210. Female spherical bearing surface 238 receives and mates with male spherical bearing of hanger 220 to form spherical joint 31. In some embodiments, female bearing surface is comprised of two or more parts that bolt together to form female bearing surface, as shown in FIGS. 24 and 25. In this embodiment, the female bearing surface 238 of swingarm 210 may be opened to receive male spherical bearing surface 237 of hanger 221 and then secured by means of spherical bearing end cap 239 and two fixing bolts 242. Other methods known in the art may be used to moveably connected the male spherical bearing with the female bearing surface of swingarm 210.

Frame 200 is connected to swingarm 210 by revolute joint 30 wherein the outer left side surface of frame 200 mates and aligns with an inner side surface of the first end of the left arm, and the outer right side surface of frame 200 mates and aligns with an inner side surface of the first end of the right arm. The bores in the left and right side surfaces of frame 200 and the bores at the first ends of the left arm and right arm of swingarm 210 are concentric. The bores line up and each bore provides a cylindrical bearing surface for the shaft of the fastening bolt 236. The bearing shaft of bolt 236 is disposed within and through the left arm bore, the left surface bore, the right surface bore, and the right arm bore, and a nut secures the fastening bolt to form a revolute joint defining a first degree of rotational freedom about a first transverse axis 46.

A first revolute joint 30 provides a first degree of rotational freedom between frame 200 and swingarm 210 about the first transverse axis 46.

Hanger 220 comprises a hanger body with a male spherical bearing 237. Hanger 220 is connected with swingarm 210 by means of spherical joint 31 wherein the male spherical bearing 237 of hanger 220 is received by a female spherical bearing surface 238 of swingarm 210 to form the spherical joint defining a second, third, and fourth degrees of rotational freedom about pitch, roll and yaw axes wherein pitch is rotation of hanger 220 relative to the swingarm 210 about a second transverse axis 47 for the motion of suspension, roll is rotation of the swingarm 210, when connected with the frame, about longitudinal roll axis 40 for the motion of leaning, and yaw is rotation of the hanger about hanger pivot axis 41 for the motion of steering the wheels when constrained by the riding surface. The swingarm compresses the compliant body and transfers torque to the hanger that rotates about a hanger pivot axis to steer the wheels constrained by the riding surface.

Spherical joint 31 provides three degrees of rotational freedom pitch, roll, and yaw between swingarm 210 and hanger 220 and is therefore kinematically equivalent with the three degrees of rotational freedom provided by the combination of revolute joints 10, 11, and 12 of the first embodiment. The three degrees of rotational freedom about spherical joint 31 and the first degree of rotational freedom about revolute joint 30 comprise a total of four degrees of rotational freedom.

In some embodiments, spring 230 is a coil spring with parallel sides and an upper arm and a lower arm. However, any spring shape could be used, as a non-limiting example barrel shaped springs, beehive springs, flat springs, and machined springs or torsion bars. In some embodiments, a bolt, washer, and nut fixedly connect an upper flat arm of the spring with the frame. In other embodiments, a bolt, washer, and a nut connect the upper arm of the spring with the frame about a vertical revolute joint.

FIGS. 24 and 25 show the compliant body may also be an elastomeric component 243 wherein the upper end of the elastomeric component 243 may be fastened to frame 201 by screws 240 and the lower end of elastomeric component 243 may be fastened to hanger 221 by screws 241, or by other means known in the art.

In some embodiments, the truck of the second embodiment is mounted at the rear of frame 200 with a steerable scooter wheel at the front of the frame. In this scooter configuration an angled longitudinal roll axis 40 is defined as rotation around a virtual line between the centroid point of spherical joint 31 and the point of contact of the front wheel with a riding surface.

In an alternative embodiment the present invention may be mounted to the front and rear of a skateboard deck that is nominally parallel to the ground. In this skateboard configuration the longitudinal roll axis 40 is defined by the centroid points of spherical joints 31 of the front and rear truck.

Longitudinal roll axis 40 may be defined by a revolute joint, a spherical joint 31, or by any other joint that allows for a similar roll axis.

A hanger pivot axis 41 is a virtual axis that is defined by a line traveling through the centroid point of spherical joint 31 and intersecting axle axis 43 as shown.

Longitudinal roll axis 40 and hanger pivot axis 41 are co-planer and intersect at the centroid point of spherical joint 31.

A hanger pivot plane 42 is a virtual plane reciprocally defined by longitudinal roll axis 40 and any point along hanger pivot axis 41 as well as hanger pivot axis 42 and any point along longitudinal roll axis 40. Thus, hanger pivot axis 41 and longitudinal roll axis 40 and the hanger pivot plane 42 are all coplanar.

The hanger pivot plane 42 of the second embodiment of the present invention is a virtual plane that floats between baseplate 200 and hanger 220.

A virtual pivot point 44 is defined by the intersection of hanger pivot axis 41 and hanger axle axis 43.

When assembled on the rear of a scooter a virtual pivot point roll axis is defined by virtual pivot point 44 and the point of contact of the front scooter wheel with the plane of the ground. When assembled as a skateboard a virtual pivot point roll axis 45 is defined by the virtual pivot points 44 of the front and rear trucks.

Kinetic Description of the Present Invention.

The unique kinematic design of embodiments of the present invention provides as described herein four motions: leaning; steering; floating; and suspension. Leaning is the primary mechanism input, steering is the primary mechanism output, floating is understood to be a measure of independence between the motions of leaning and steering, and suspension is the full load bearing capacity of the compliant bodies supporting the sprung mass of the vehicle and rider with nominally vertical compliance, road vibration and bump absorption.

Within the context of the specific kinematic design of the present invention the compliant body in each truck completes the closed kinematic chain of the rigid bodies and one compliant body and by doing so couples and constrains the motions of the rigid bodies.

FIGS. 10, 11, 14 and 15 show a truck of the first embodiment mounted to the front of a skateboard deck 3. FIGS. 12, 13, 16 and 17 show a truck of the second embodiment mounted to the rear of a scooter.

Figure 10:
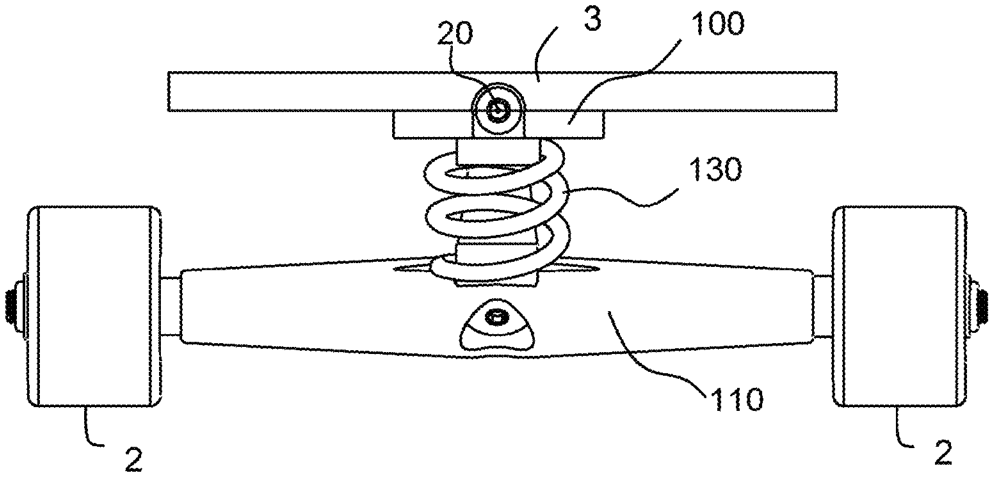
FIG. 10 shows a rear view of the first embodiment of the present invention, shown as if mounted to the front of a skateboard with a deck, in a central and neutral position with a relaxed spring, not leaning and not steering.
Figure 12:
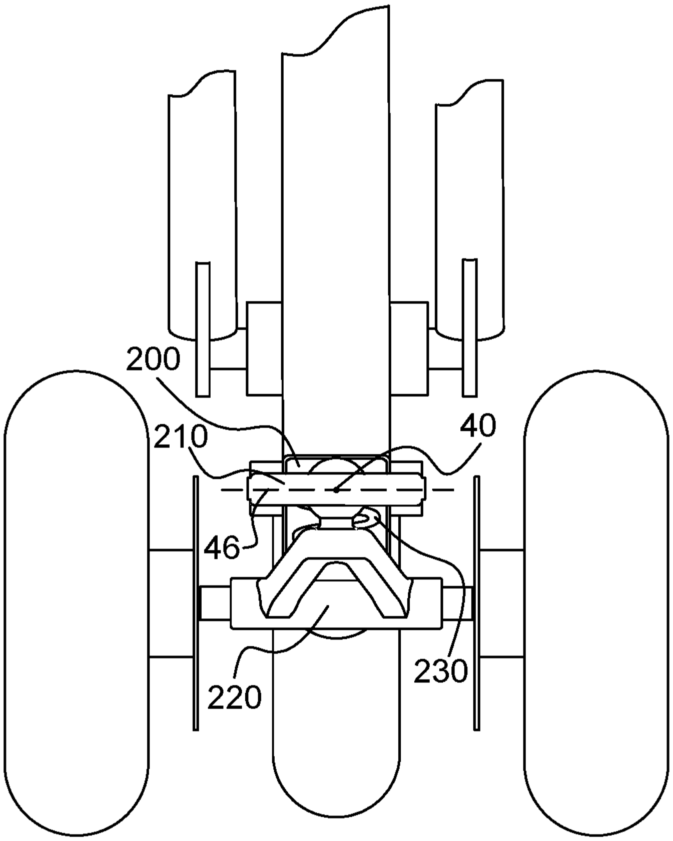
FIG. 12 shows a rear view of the second embodiment of the present invention, mounted to the rear of a scooter, in a central and neutral position with a relaxed spring, not leaning and not steering.

FIGS. 10 and 12 of the first and second embodiment show the central position of no leaning and no steering where the spring 130 or spring 230 respectively are in an extended or neutral state.

Figure 11:
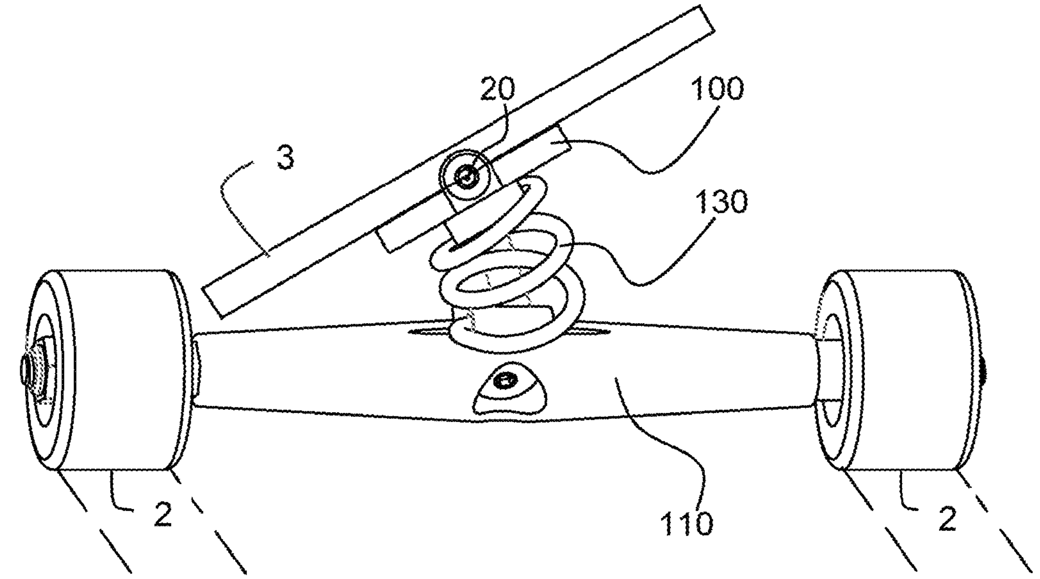
FIG. 11 shows a rear view of first embodiment of the present invention, shown as if mounted to the front of a skateboard with a deck, leaning left for a left turn, spring compressed and bending left, and wheels steering left on a riding surface.

With the assembly of the present invention in use with wheels constrained by the plane of the riding surface, the first primary input motion of leaning is rotation of the front and rear baseplates and deck about longitudinal roll axis 20 in the first embodiment, as shown in FIG. 11. In the second embodiment, the first primary input motion of leaning is rotation of the frame and deck about longitudinal roll axis 40, as shown in FIG. 13.

The kinematic description above shows that the presence of longitudinal roll axes 20 and 40 of the first and second embodiments respectively introduces an extra degree of freedom that mechanically isolates the motions of leaning and steering. With the present invention compliant bodies are required for the integrity of the spatial mechanism, to couple, constrain, and transfer torque between the rider, the rigid bodies of the mechanism, and the fixed frame of the ground.

FIG. 11 shows a rear view of the first embodiment of the present invention, mounted on the front of a skateboard with baseplate 100 and deck leaning left for a left turn, spring 130 compressed and bending left, and hanger 110 and wheels steering left on a riding surface.

Figure 13:
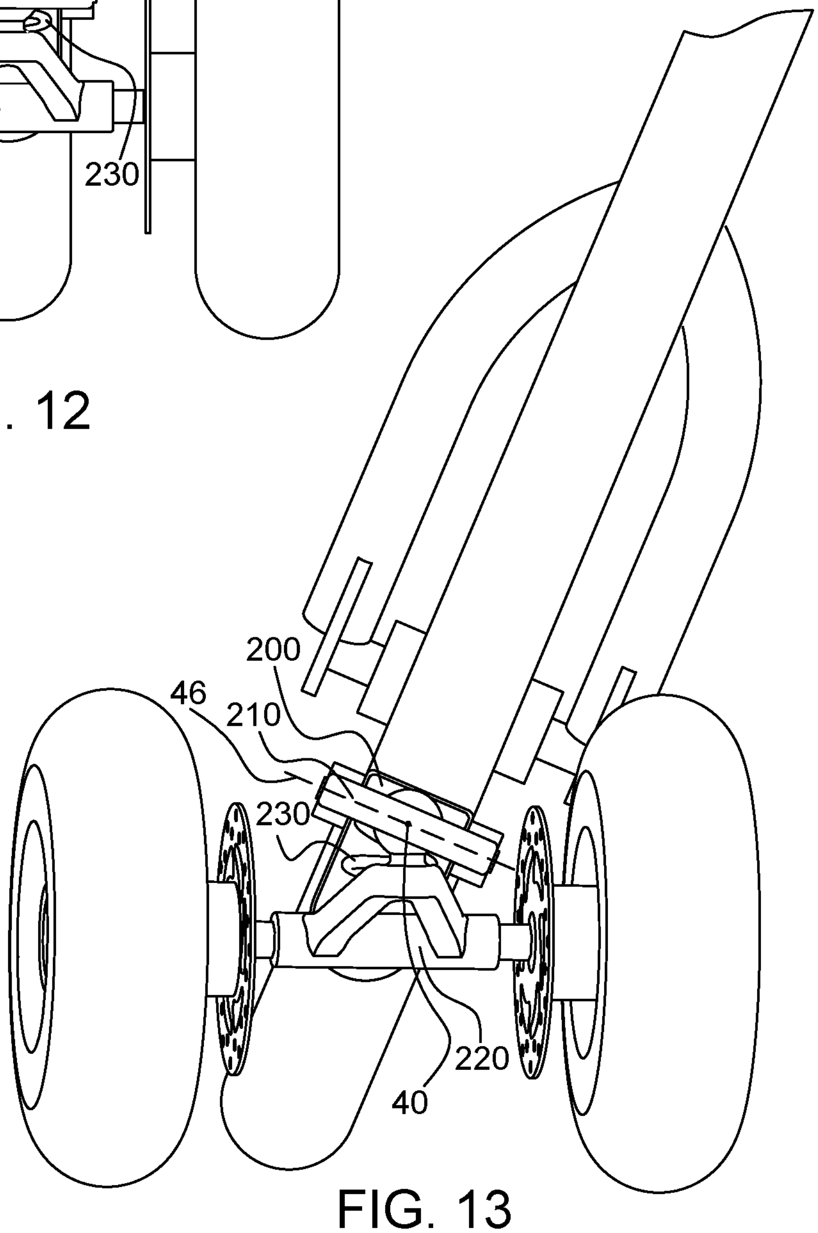
FIG. 13 shows a rear view of the second embodiment of the present invention mounted to the rear of a scooter leaning right for a right turn, spring compressed and bending right, and wheels steering left.

FIG. 13 shows a rear view of the second embodiment of the present invention mounted to the rear of a scooter with swingarm 210 leaning right for a right turn, spring 230 compressed and bending right, and hanger 220 and wheels steering left. Leaning right and steering left is the usual steering response for a truck mounted on the rear of a lean steering vehicle such as a scooter.

Rider input torque causes leaning of the deck and baseplate 100 of the first embodiment. Compliant body, either spring 130 or elastomeric component 131, in turn transfers torque to hanger 110 resulting in steering of hanger 110 and the wheels on the ground.

Similarly, in the second embodiment, rider input torque causes leaning of the handlebar, frame 200, and swingarm 210 compressing the compliant body. The compliant body, either spring 230 or elastomeric component 243, in turn transfers torque to hanger 220 resulting in steering of hanger 220 and the wheels on the riding surface.

With the assembly of riding devices of the present invention in use with wheels constrained by the plane of the riding surface a third primary motion of floating is defined herein as a range of independence between the motions of steering and leaning, wherein there is a range of leaning without steering and a range of steering without leaning.

As shown in FIGS. 14-17 the motion of floating is shown to be a range of leaning without steering and a range of steering without leaning.

Figure 14:
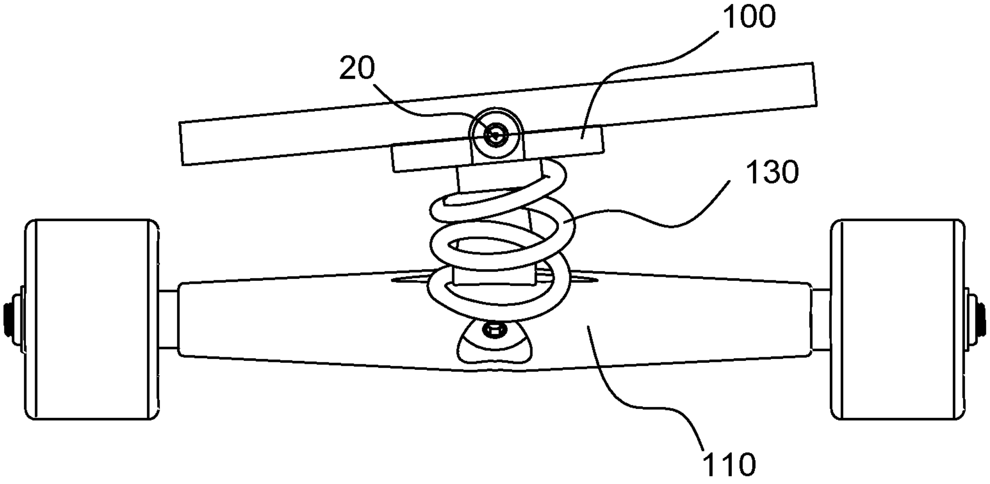
FIG. 14 shows a rear view of the first embodiment of the present invention, shown as if mounted to the front of a skateboard with a deck, with some left leaning and no steering.
Figure 16:
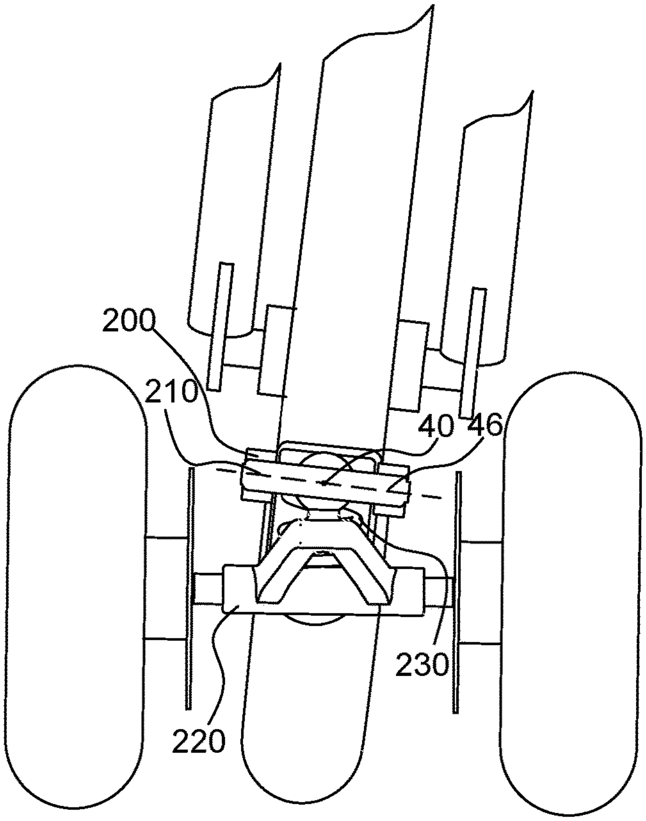
FIG. 16 shows a rear view of the second embodiment of the present invention with some right leaning and no steering.

FIGS. 14 and 16 show the truck of the first and second embodiment of the present invention with an initial range of leaning and partially compressing the springs where the transfer of torque through the compliant body is not sufficient to overcome the friction and restriction of wheels on the riding surface showing a condition of leaning without steering.

Figure 15:
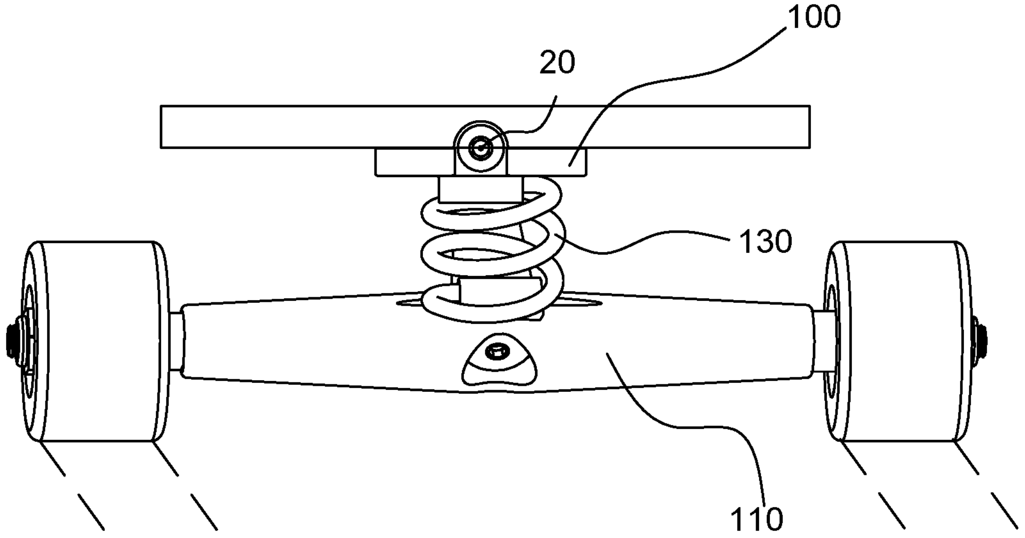
FIG. 15 shows a rear view of the first embodiment of the present invention, shown as if mounted to the front of a skateboard with a deck, with no leaning and some steering on a riding surface.
Figure 17:
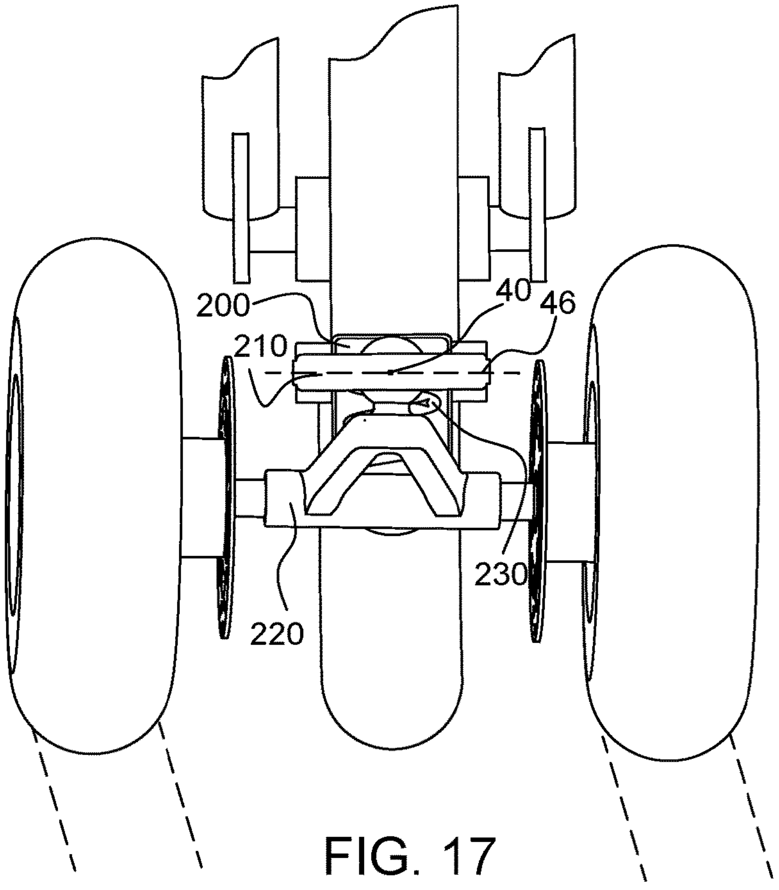
FIG. 17 shows a rear view of the second embodiment of the present invention with no leaning and some left steering on a riding surface.

FIGS. 15 and 17 show a rear view of the first and second embodiments not leaning and hanger and wheels steering. The ability of the present invention to steer without leaning is a benefit to the rider when the wheels receive asymmetric impacts from irregularities on the ground that would normally cause a condition called “bump steer”. With the kinematic design of the present invention the compliant body is able to absorb small bumps and vibrations that might otherwise cause steering instability and reduced traction.

Steering responsiveness and the immediacy of torque transfer between the rigid bodies through the compliant body sufficient to cause steering can be controlled in several ways.

The native stiffness of compliant body controls the steering responsiveness of the present invention such that the stiffer the compliant body the more immediate the transfer of torque between the rigid bodies and the faster the steering response.

As well, control of the shape of the compliant body and the method of connecting the compliant body to the rigid bodies controls the moments and geometry acting on the compliant body and thus the immediacy of the steering response.

With wheels constrained by the plane of the ground the compliant body provides a return to center spring force such that increased leaning is met by progressively higher levels of return to center spring force. The compliant body further provides spring force for return of the kinematic chain to a central and neutral position, and for full load bearing suspension.

FIGS. 18-21 show that the specific geometry and kinematic design of the trucks of the present invention provide a range of suspension travel of the hanger and wheels relative to the baseplate/deck, or frame.

Figure 18:
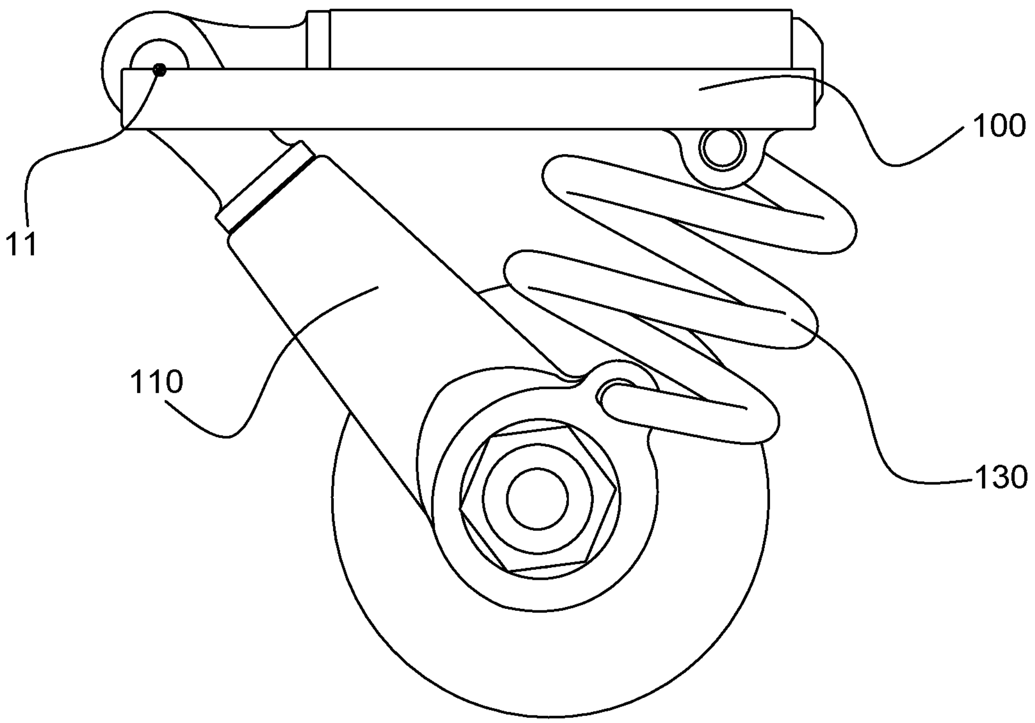
FIG. 18 shows a side view of the first embodiment of the present invention under no load with the spring extended and relaxed and with the closest wheel not shown for clarity.
Figure 19:
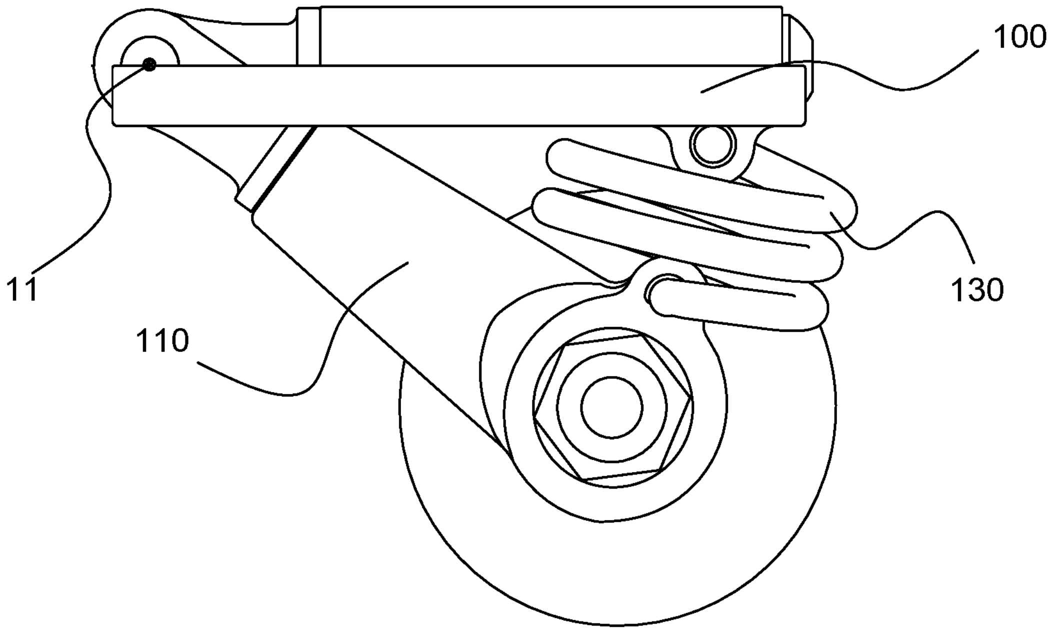
FIG. 19 shows a side view of first embodiment of the present invention under suspension load with the spring compressed, and with the closest wheel not shown for clarity.

FIGS. 18 and 19 of the first embodiment show upper pivot arm 120 and lower pivot arm 121 rotate about revolute joint 11 (and about transverse axis 21) for a range of hinged motion between baseplate 100 and hanger 110 such that compression and extension of spring 130 provides full load bearing suspension. The same rotation and range of hinged motion occurs when elastomeric component 131 is used.

Figure 20:
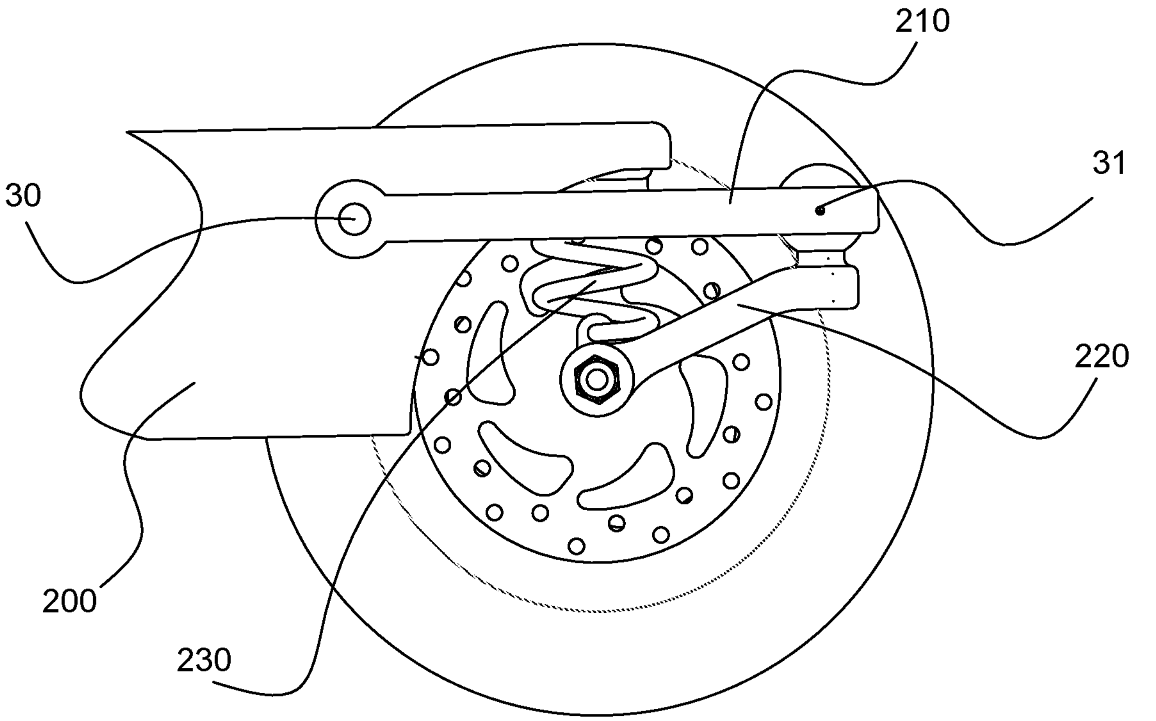
FIG. 20 shows a side view of the second embodiment of the present invention under no load with the spring extended and relaxed, and with the closest wheel not shown for clarity.
Figure 21:
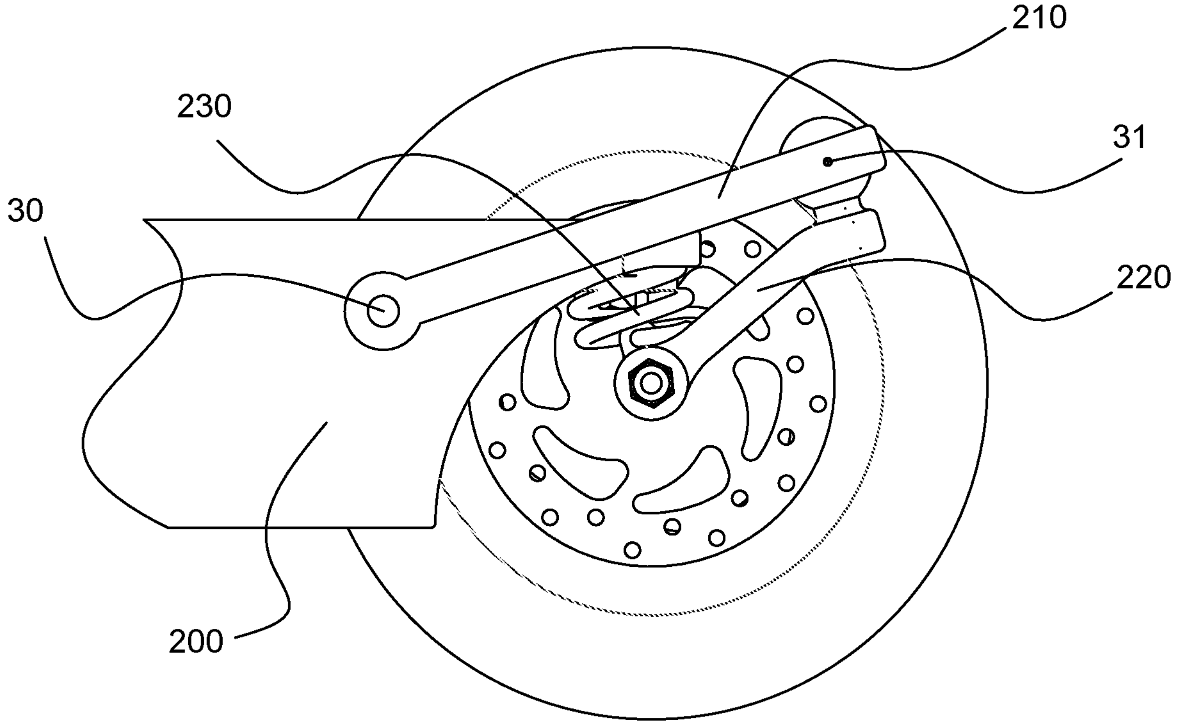
FIG. 21 shows a side view of the second embodiment of the present invention under suspension load with the spring compressed and with the closest wheel not shown for clarity.

FIGS. 20 and 21 of the second embodiment show that rotation of swingarm 210 about revolute joint 30 combined with the three degrees of freedom afforded by spherical joint 31 allows multi-vector suspension travel of the wheel relative to frame 200 of a scooter or deck of a skateboard. The same multi-vector suspension travel of the wheel relative to the frame occurs when elastomeric component 243 is used.

With the present invention the combined motions of floating and suspension of each truck are coupled and constrained by a single compliant body that provides both a return to center spring force as well as spring force to stabilize displacements of individual wheels rolling over symmetrical and asymmetrical road irregularities.

Ride Dynamics of the Present Invention.

Skateboards and operating at higher speed are subject to progressively higher levels of road vibration. In addition, the wheels on the ground will be subject to asymmetrical road impacts that cause unwanted steering. As vibration and unwanted steering transfers up from the wheels through the trucks to the rider the skateboard bounces and feels loosely connected to the ground. At the same time steering becomes hyper-sensitive to rider inputs. These conditions combined with lack of rider skill can lead to a type of steering oscillation commonly called "speed wobbles" that often ends with catastrophic results of crashing and rider injury.

Expert skateboard riders learn to relax and absorb the unwanted vibration with their body and at the same time learn to adjust to the changing level of input sensitivity as speed increases. Riders seeking control at higher speeds tend to select existing trucks specifically designed for downhill speeds that have a much slower steering response. Riders will configure downhill trucks with firmer elastomeric bushings and higher levels of preload adjustment. So, while straight line speed may be improved, maneuverability at slower speeds is greatly reduced.

As has been described above, the skateboard assembly with trucks of the present invention has four primary motions of leaning, steering, floating, and suspension. Floating and the full load bearing suspension qualities of the compliant bodies allow the trucks of the present invention to isolate and dampen much more unwanted road vibration and road-caused steering impulses than conventional trucks and so provide a smoother ride with improved traction, and better control that much more closely mimics the standing on liquid feel of surfing and other board sports.

Floating also means that assembled skateboards and other riding devices of the present invention are less sensitive to rider input for the first few degrees of deck lean which isolates steering from unintentional rider input which in turn results in more consistent primary lean-steering response throughout the speed range.

With conventional double spring trucks lateral forces in turns have little effect on steering.

In contrast, the truck of the present invention has a load path through the truck that can result in a secondary lateral steering response such that rider leg extension during a turn causes a subtle steering response of increasing the radius of the turn whereas a reduction of leg pressure slightly decreases the turn radius. Like the motions of floating and suspension this small measure of lateral force steering is constrained by the compliant body. The lateral compliance of the present invention provides a softness and rebound at mid-turn which improves the timing and rhythm of linked turns and amplifies the floating sensation between linked turns.

Skateboards with trucks of the present invention have longitudinal roll axes very close to the standing surface supporting the rider. The close proximity of the longitudinal roll axes with the riding surface combined with the blended leaning motion of the deck about the longitudinal roll axis and virtual pivot point roll axis results in a foot-to-deck interface and deck motion that more closely mirrors the natural standing-on-water sensation of surfing and other board sports.

In combination the above ride dynamics of the present invention represents a new class of lean-steering mechanisms that provides a fluid, surfing like ride feel and control.

The above description presents the best mode contemplated in carrying out the invention(s) described herein. However, it is susceptible to modifications and alternate constructions from the embodiments shown in the figures and accompanying description. Consequently, it is not intended that the invention be limited to the particular embodiments disclosed. On the contrary, the invention is intended to cover all modifications, sizes and alternate constructions falling within the spirit and scope of embodiments of the invention.

What is claimed is:

1. A truck for a riding device comprising:

a closed kinematic chain comprising four rigid bodies and one compliant body, the four rigid bodies comprising a baseplate, an upper pivot arm, a lower pivot arm, and a hanger connected with two laterally spaced wheels;

a first revolute joint connecting the baseplate with the upper pivot arm;

a second revolute joint connecting the upper pivot arm with the lower pivot arm;

a third revolute joint connecting the lower pivot arm with the hanger;

the compliant body comprising an upper end and a lower end wherein the upper end of the compliant body is connected with the baseplate and the lower end of the compliant body is connected with the hanger, and the compliant body is connected to the four rigid bodies to form the closed kinematic chain, the compliant body transfers torque between the rigid bodies, provides spring force for full load bearing suspension, and provides spring force to return of the kinematic chain to a central, neutral position;

three degrees of rotational freedom, where a first degree of freedom is rotation about a longitudinal roll axis, a second degree of freedom is rotation about a transverse axis, and a third degree of freedom is rotation about a hanger pivot axis and wherein the compliant body couples and constrains the three degrees of freedom of the four rigid bodies.

2. The truck of claim 1 wherein, the baseplate further comprises a baseplate body with a longitudinal bore that receives a shaft end of the upper pivot arm, wherein the shaft end of the upper pivot arm rotates within the longitudinal bore about the longitudinal roll axis comprising the first degree of freedom;

the upper pivot arm further comprises the shaft end and an eye-bolt end;

the lower pivot arm further comprises a shaft end and a yoke end;

wherein the eye-bolt end of the upper pivot arm is disposed within the yoke end of the lower pivot arm, and a pin moveably connects the eye-bolt end and the yoke end about the transverse axis and comprising the second degree of freedom; and the hanger further comprises a hanger body with a cylindrical bore that receives the shaft end of the lower pivot arm, wherein the shaft end of the lower pivot arm rotates within the cylindrical bore about the hanger pivot axis comprising the third degree of freedom.

3. The truck of claim 1 wherein the compliant body is a spring with an upper arm and a lower arm.

4. The truck of claim 3 wherein a fourth revolute joint connects the upper arm of the spring with a bottom surface of the baseplate.

5. The truck of claim 3 wherein a fifth revolute joint connects the lower arm of the spring with the hanger.

6. The truck of claim 1 wherein the compliant body is an elastomeric component with an upper end connected with the baseplate and a lower end connected with the hanger.

7. A riding device comprising the truck of claim 1 wherein a first truck is a front truck comprising a front baseplate, front compliant body, front upper pivot arm, front lower pivot arm, front hanger, front hanger pivot axis, and front laterally-spaced wheels, and a second truck is a rear truck comprising a rear baseplate, rear compliant body, rear upper pivot arm, rear lower pivot arm, rear hanger, rear hanger pivot axis, and rear laterally-spaced wheels, and the riding device comprises the front truck connected with a front of a deck and the rear truck connected with a rear of the deck wherein front compliant body and rear compliant body connect an input motion of leaning the deck and baseplates with an output motion of steering the laterally spaced wheels constrained by a plane of a riding surface.

8. The riding device of claim 7 with four primary motions comprising leaning, steering, floating, and suspension wherein, a first primary motion of leaning comprises rotation of the deck, front baseplate, and rear baseplate about the longitudinal roll axis;

a second primary motion of steering comprises input torque leaning the deck, front baseplate, and rear baseplate compressing front compliant body and rear compliant body and transferring torque to the front and rear hangers to rotate about the front and rear hanger pivot axes steering the front and rear wheels;

a third primary motion of floating comprises a range of leaning without steering and a range of steering without leaning; and a fourth primary motion of suspension comprises compression and extension of the front and rear compliant bodies and rotation of the front and rear upper pivot arms and the front and rear lower pivot arms about the transverse axes of the front and rear trucks.

9. The riding device of claim 7 wherein the riding device is selected from the group consisting of a skateboard, a scooter, or a device with a deck and a front truck and a rear truck.

* * * * *